United States Patent [19]
Little et al.

[11] Patent Number: 6,116,966
[45] Date of Patent: Sep. 12, 2000

[54] HIGH POWER ELECTRICAL CONTACTS FOR ROBOTIC TOOL CHANGER

[75] Inventors: Robert D. Little, Apex; Prasad Balakrishnan, Raleigh, both of N.C.

[73] Assignee: ATI Industrial Automation, Inc., Garner, N.C.

[21] Appl. No.: 09/061,994

[22] Filed: Apr. 17, 1998

[51] Int. Cl.$^7$ ............................................... H01R 13/24
[52] U.S. Cl. .......................... 439/700; 439/814; 439/891
[58] Field of Search ................................... 439/700, 824, 439/289, 176

[56] References Cited

U.S. PATENT DOCUMENTS

| | | | |
|---|---|---|---|
| 2,716,737 | 8/1955 | Maberry | 439/167 |
| 3,185,955 | 5/1965 | Keller | 339/91 |
| 3,719,862 | 3/1973 | Gaicki | 317/234 R |
| 3,736,550 | 5/1973 | Wallace et al. | 439/814 |
| 3,801,764 | 4/1974 | Rolff et al. | 200/148 R |
| 3,808,577 | 4/1974 | Mathauser | 439/12 R |
| 3,810,258 | 5/1974 | Mathauser | 339/12 R |
| 3,819,889 | 6/1974 | Majkrzak et al. | 200/48 R |
| 3,848,223 | 11/1974 | Pechard | 339/176 |
| 3,926,495 | 12/1975 | Pissarev et al. | 339/48 |
| 3,945,700 | 3/1976 | Didier | 339/59 M |
| 4,170,393 | 10/1979 | Mocek, Jr. et al. | 339/63 M |
| 4,192,981 | 3/1980 | Barkan et al. | 200/144 B |
| 4,409,464 | 10/1983 | Favareto et al. | 219/136 |
| 4,506,123 | 3/1985 | Kaufmann et al. | 200/83 J |
| 4,520,550 | 6/1985 | Dunn et al. | 29/568 |
| 4,525,918 | 7/1985 | Puritz | 29/568 |
| 4,636,135 | 1/1987 | Bancon | 414/730 |
| 4,676,142 | 6/1987 | McCormick et al. | 92/130 R |
| 4,686,866 | 8/1987 | Rosheim | 74/479 |
| 4,703,986 | 11/1987 | McCormick | 439/607 |
| 4,707,044 | 11/1987 | Burns | 439/289 |
| 4,734,051 | 3/1988 | Burns | 439/289 |
| 4,815,780 | 3/1989 | Obrist | 294/86.4 |
| 4,830,569 | 5/1989 | Jannborg | 414/729 |
| 4,875,275 | 10/1989 | Hutchinson, et al. | 29/568 |
| 4,883,939 | 11/1989 | Sagi | 219/125.1 |
| 4,917,619 | 4/1990 | Nishiwaki | 439/191 |
| 4,993,132 | 2/1991 | Manz | 29/26 A |
| 4,995,493 | 2/1991 | Cotsman et al. | 192/150 |
| 5,010,228 | 4/1991 | Nishiwaki | 219/86.25 |
| 5,030,106 | 7/1991 | Cameron et al. | 439/8 |
| 5,133,680 | 7/1992 | Watson et al. | 439/829 |
| 5,137,467 | 8/1992 | Arai | 439/374 |
| 5,172,473 | 12/1992 | Burns et al. | 29/885 |
| 5,211,501 | 5/1993 | Nakamura et al. | 403/322 |
| 5,220,126 | 6/1993 | Borgwath et al. | 89/28.05 |
| 5,283,499 | 2/1994 | Adam et al. | 313/135 |
| 5,387,774 | 2/1995 | Boyer et al. | 219/86.33 |
| 5,460,536 | 10/1995 | Cullen | 439/289 |
| 5,653,615 | 8/1997 | Inaba et al. | 439/827 |
| 5,713,765 | 2/1998 | Nugent | 439/700 |

FOREIGN PATENT DOCUMENTS

| | | | |
|---|---|---|---|
| 06076866 | 3/1994 | Japan | H01R 4/28 |
| WO9816091 | 4/1998 | WIPO | H05H 1/34 |

*Primary Examiner*—Steven L. Stephan
*Assistant Examiner*—J. F. Duverne
*Attorney, Agent, or Firm*—Moore & Van Allen, PLLC; Michael G. Johnston

[57] ABSTRACT

Disclosed are male and female electrical contacts for transferring high electrical power between a master assembly and a tool assembly of a robotic tool changer. The male and female contacts have corresponding outwardly-projecting and inwardly recessed conical or frusto-conical contact surfaces which tend to cause contaminants to slide off the surface of the contacts. The contacts may instead have corresponding outwardly-projecting and inwardly recessed contact surfaces having spherical, frusto-spherical, ellipsoid, frusto-ellipsoid, ovoid, or frusto-ovoid shapes. Each of the contacts includes a contact base for attaching the contact to one of the assemblies of the robotic tool changer and a contact tip removably attached to the contact base, thereby allowing the contact tip to be replaced without detaching the contact base from the robotic tool changer. The contact tip of either or both of the electrical contacts is mounted in such a way as to have compliance in at least one direction. The contact bases have oval or elliptical shaped though-holes for making better contact with the high power cables of the robotic tool changer. The contacts are rhodium-plated to increase their resistance to wear and contamination.

20 Claims, 7 Drawing Sheets

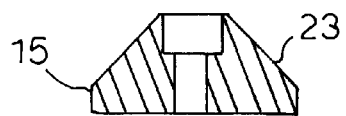
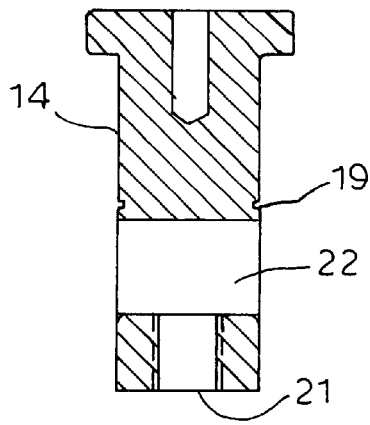
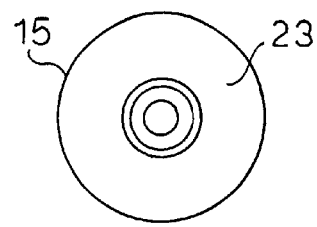
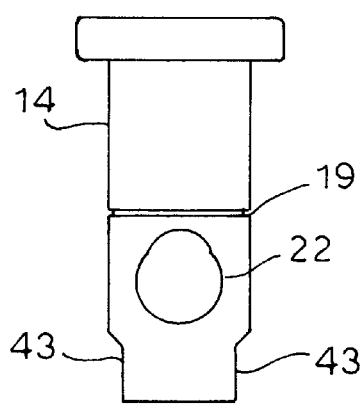
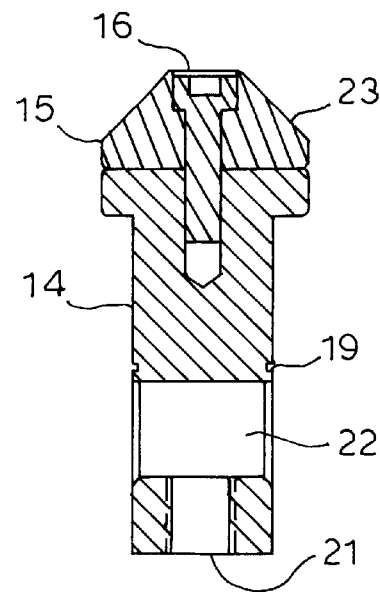
FIG. 7
FIG. 5
FIG. 8
FIG. 6
FIG. 9

HIGH POWER ELECTRICAL CONTACTS FOR ROBOTIC TOOL CHANGER

BACKGROUND OF THE INVENTION

1. Field of the Invention

The present invention relates generally to the field of robotic tool changers and more particularly to high power electrical contacts for robotic tool changers.

2. Description of Related Art

Robots have been used for many years in industrial assembly line applications to perform repetitive tasks very precisely without the need for human operation, interaction, or supervision. For instance, robots are commonly used in the automotive industry to perform a number of tasks such as material handling and spot-welding of automobile bodies.

In many cases, a robot has a dedicated function which is the only function it performs. In certain circumstances, however, it is desirable for a single robot to perform various different tasks. For instance, it might simplify the production line to provide a single robot capable of spot-welding, palletizing heavy loads, and engaging in metal removal operations. In order to provide this flexibility, a robotic tool changer is used to give the robot access to the tools it needs to perform its various tasks.

The robotic tool changer is a device that provides the means for a robot or other automatic machine to easily exchange tools as required for different jobs. As shown in FIG. 1, a robotic tool changer is usually made up of two halves—a master assembly 1 and a tool assembly 2. A single master 1 assembly is permanently attached to the arm 3 of the robot, while several tool assemblies 2 are associated with the various tools (not shown) to be used by the robot. When the robot needs a certain tool, it simply couples its master assembly 1 to the tool assembly 2 of the appropriate tool. When the master and tool assemblies 1 and 2, respectively, are coupled together, they provide the mechanical, electrical, and pneumatic connections and signal interfaces which permit the robot to perform the particular task.

Some tools that a robot may use to perform a particular task, such as spot-welding, require the robot to supply high power (10–500 Amps at 100–1000 Volts) to the tool. For these applications, the master and tool assemblies of the robotic tool changers are each provided with a high power module 4. Such high power modules 4 provide the means for transferring the necessary high electrical energy between master and tool assemblies 1 and 2. The high power modules 4 may be integral with the master and tool assemblies 1 and 2, or they may be removably attached to the master and tool assemblies 1 and 2.

The electrical connection between the master and tool assemblies 1 and 2 is made by high power electrical contacts 5 integrated into the high power modules 4. Typically, each high power module 4 contains multiple electrical contacts 5 extending into openings within the module's electrically insulating housing. In order to maximize the surface area available for making electrical contact, the contacts 5 usually have a large, flat contact surface 7, as shown in FIG. 2. During operation, the high power modules 4 (FIG. 1) of the master and tool assemblies 1 and 2 are mated together so that their sets of contacts 5 align and abut. Since the electrical contacts 5 are electrically connected to heavy duty electrical cables, the transfer of high power may be realized.

Under ideal conditions, the useful life of prior art electrical contacts 5 is on the order of several million cycles, after which the contacts 5 must be replaced. However, during normal usage on an assembly line, the high power electrical contacts 5 are subjected to a number of environmental contaminants which may drastically shorten their life. When the master and tool assemblies 1 and 2 of the robotic tool changer are not connected, the contacts 5 of the high power modules 4 are left exposed. Particularly, the contacts 5 on the tool assembly's high power module 4 are left exposed and upright with their flat contact surfaces 7 essentially horizontal during non-use. During the period of exposure, the high power electrical contacts 5 may encounter contaminants such as dirt, dust, grease, water, and other foreign objects. Because the contacts 5 have flat contact surfaces 7, the contaminants will tend to come to rest on the flat contact surface 7 rather than sliding off onto another portion of the high power module 4.

If other welding operations are being conducted nearby, the high power electrical contacts 5 are also subjected to welding slag. Welding slag is composed of minute particles of molten metal, and oxides thereof, that are generated and sprayed about in the spot-welding process, usually as bright sparks. In the molten state, welding slag may bond to the electrical contacts 5 of the high power modules 4. In this situation, the welding slag may then solidify or become welded onto the high power electrical contacts 5. The molten welding slag may also solidify in mid-air, thereafter landing on the high power electrical contacts 5 in a hardened state.

Later, when the master and tool assemblies 1 and 2 are mated so that an electrical connection is made between the high power modules 4, the welding slag or other contamination on the contacts 5 may cause the electrical contacts 5 to overheat, melt, arc, pit, and/or corrode. Specifically, when an electrical contact 5 contaminated with welding slag is mated to another contact 5, a large portion of the current passing through the contact 5 connection tends to divert through the welding slag. With such a concentration of high power across the welding slag, the welding slag may heat to the point of fusion, ablation, or oxidation. This intense heat may cause the contact surface 7 (FIG. 2) of the electrical contacts 5 to become pitted or even welded together. Pitting results in an uneven contact surface that reduces the surface area of the contacts 5 actually touching each other. This increases the resistance of the circuit, thereby generating additional unnecessary heat and reducing the power available to the robot.

Therefore, once an electrical contact 5 becomes contaminated and damaged, the contact 5 must be replaced. Previously, replacement of a contaminated electrical contact 5 involved disassembly of the entire high power module 4, disconnection of the electrical cables, removal and replacement of the contact 5, reconnection of the cables, and reassembly of the module 4. Replacement, therefore, was a time-consuming, labor-intensive, and expensive process.

The inventors of U.S. Pat. No. 5,460,536, which issued on Oct. 24, 1995 to Applied Robotics, Inc., recognized the problems associated with replacement of high power electrical contacts on robotic tool changers. Their patented solution to the problem was to provide electrical contacts which can be replaced without having to disassemble the high power modules which house the contacts.

While providing easily replaceable electrical contacts is one way of lessening the impact of contaminated and damaged contacts, replacing such contacts still requires taking the robot out of service for a period of time. Obviously, this leads to production line down-time and reductions in overall efficiency. It would be more advantageous to provide a high power electrical contact which, in addition to being easily replaceable, is less susceptible to contamination and damage in the first place, therefore needing replacement less often than traditional contacts.

BRIEF SUMMARY OF THE INVENTION

Thus, it is an object of the present invention to provide high power electrical contacts for use on a robotic tool changer which are resistant to contamination as well as being easily replaceable.

A high power electrical contact pair is provided for carrying electrical current between two halves of a robotic tool changer. The robotic tool changer may include a master assembly attached to a robot and a tool assembly attached to a tool to be used by the robot. The contact pair preferably comprises a male electrical contact mounted on one half of the robotic tool changer and a female electrical contact mounted on the other half of the robotic tool changer.

The male electrical contact preferably has an outwardly-projecting conical or frusto-conical contact surface, while the female electrical contact preferably has an inwardly-recessed conical or frusto-conical contact surface adapted to mate with the outwardly-projecting conical or frusto-conical contact surface of the male electrical contact. When the two halves of the robotic tool changer are brought together, the outwardly-projecting conical or frusto-conical contact surface of the male electrical contact mates with the inwardly-recessed conical or frusto-conical contact surface of the female electrical contact, thereby allowing electrical current to flow between the male electrical contact and the female electrical contact.

The angle between the outwardly-projecting conical or frusto-conical contact surface of the male electrical contact and a plane perpendicular to the axis of the male electrical contact is preferably between about 30° and about 60°, ideally about 45°. The angle between the inwardly-recessed conical or frusto-conical contact surface of the female electrical contact and a plane perpendicular to the axis of the female electrical contact is approximately the same as the angle between the outwardly-projecting conical or frusto-conical contact surface of the male electrical contact and a plane perpendicular to the axis of the male electrical contact.

Preferably, the male electrical contact is mounted on the tool assembly and the female electrical contact is mounted on the master assembly of the robotic tool changer.

The male and female electrical contacts are preferably made out of copper or a copper alloy. The outwardly-projecting conical or frusto-conical contact surface of the male electrical contact and the inwardly-recessed conical or frusto-conical contact surface of the female electrical contact are preferably rhodium-plated.

The male electrical contact preferably comprises a male contact tip having the outwardly-projecting conical or frusto-conical contact surface, and a male contact base for attaching the male electrical contact to half of the robotic tool changer. The male contact tip preferably is removably attached to the male contact base, thereby allowing the male contact tip to be replaced without detaching the male contact base from its half of the robotic tool changer. Similarly, the female electrical contact preferably comprises a female contact tip having the inwardly-recessed conical or frusto-conical contact surface, and a female contact base for attaching the female electrical contact to the other half of the robotic tool changer. The female contact tip preferably is also removably attached to the female contact base, thereby allowing the female contact tip to be replaced without detaching the female contact base from the other half of the robotic tool changer.

The female contact tip preferably is removably attached to the female contact base in such way as to have compliance in at least one direction. The female electrical contact preferably further comprises a screw removably attaching the female contact tip to the female contact base, the screw having a shaft. The female contact tip has a hole through which the screw passes, the hole having a diameter larger than the diameter of the shaft of the screw, thereby giving the female contact tip compliance in a direction perpendicular to the axis of the screw. Preferably, the screw, when fully tightened, does not press the female contact tip firmly against the female contact base, thereby giving the female contact tip rotational compliance. An electrically-conducting lubricant is preferably applied between the female contact tip and the female contact base.

The male contact tip preferably is also removably attached to the male contact base in such way as to have compliance in at least one direction. The male electrical contact preferably comprises a screw removably attaching the male contact tip to the male contact base, said screw having a shaft. The male contact tip has a hole through which the screw passes, the hole having a diameter larger than the diameter of the shaft of the screw, thereby giving the male contact tip compliance in a direction perpendicular to the axis of the screw. Preferably, the screw, when fully tightened, does not press the male contact tip firmly against the male contact base, thereby giving the male contact tip rotational compliance. An electrically-conducting lubricant is preferably applied between the male contact tip and the male contact base.

The robotic tool changer may include one or more high power cables. The male contact base preferably has a threaded opening and an oval-shaped or elliptical-shaped through-hole intersecting the threaded opening. The male electrical contact preferably comprises a set screw adapted to screw into the threaded opening to secure the high power cable within the through-hole.

Similarly, the female contact base preferably has a threaded opening and an oval-shaped or elliptical-shaped through-hole intersecting the threaded opening. The female electrical contact also preferably comprises a set screw adapted to screw into the threaded opening to secure the high power cable within the through-hole.

Alternatively, the male electrical contact may have an outwardly-projecting contact surface having a shape selected from the group consisting of spherical, frusto-spherical, ellipsoid, frusto-ellipsoid, ovoid, and frusto-ovoid shapes. The female electrical contact would then have an inwardly-recessed contact surface adapted to mate with the outwardly-projecting contact surface of the male electrical contact, thereby allowing electrical current to flow between the male electrical contact and the female electrical contact.

BRIEF DESCRIPTION OF THE DRAWINGS

The present invention will be more fully understood by reference to the detailed description below when considered in conjunction with the following drawings wherein like reference numbers denote the same or similar items shown throughout the several Figures, in which:

FIG. 5 is a cross-section of the male contact base;

FIG. 6 is a side view of the male contact base;

FIG. 7 is a cross-section of the male contact tip showing the conical contact surface;

FIG. 8 is a top view of the male contact tip;

FIG. 9 is a cross-section of the male contact tip attached to the male contact base by a screw;

DETAILED DESCRIPTION OF THE INVENTION

Figure 1:
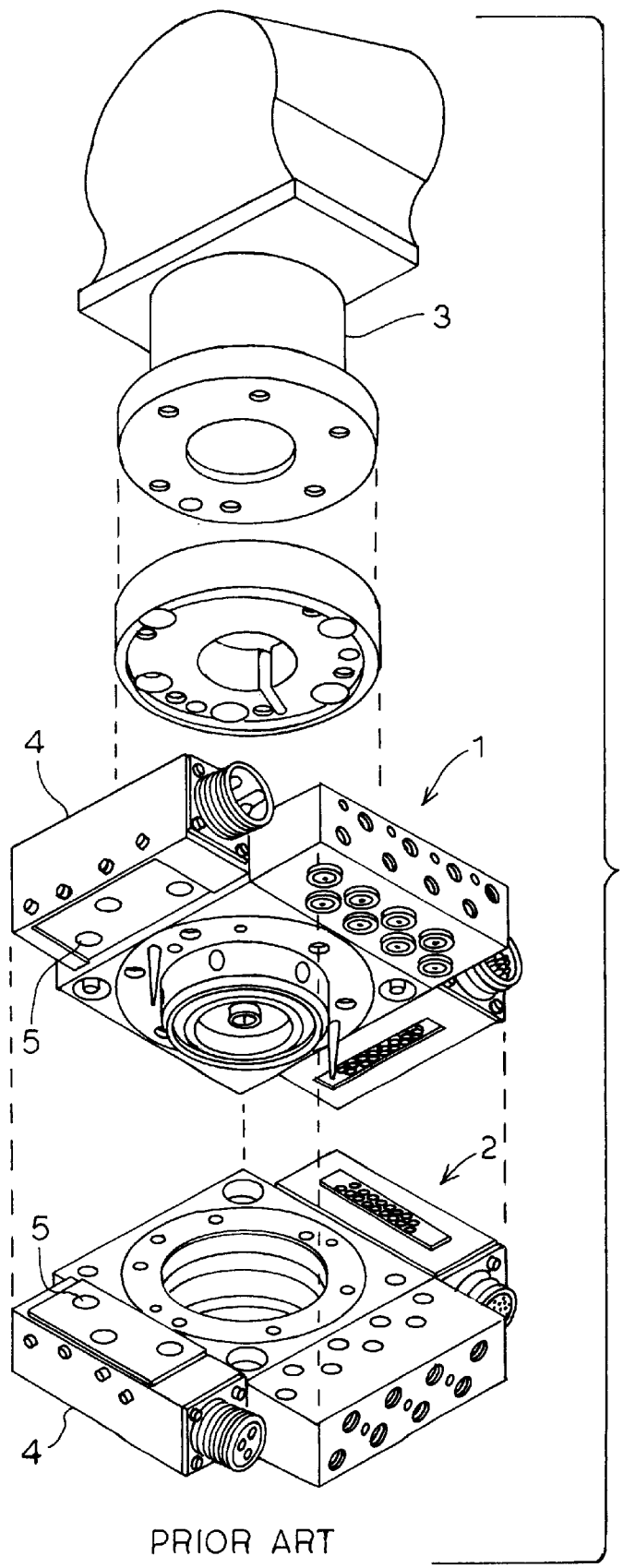
FIG. 1 is a perspective view of a robotic tool changer having prior art electrical contacts.
Figure 2:
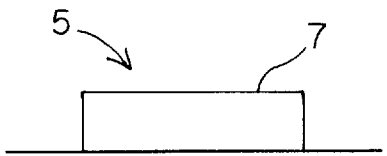
FIG. 2 is a side view of a prior art electrical contact having a flat contact surface.
Figure 3:
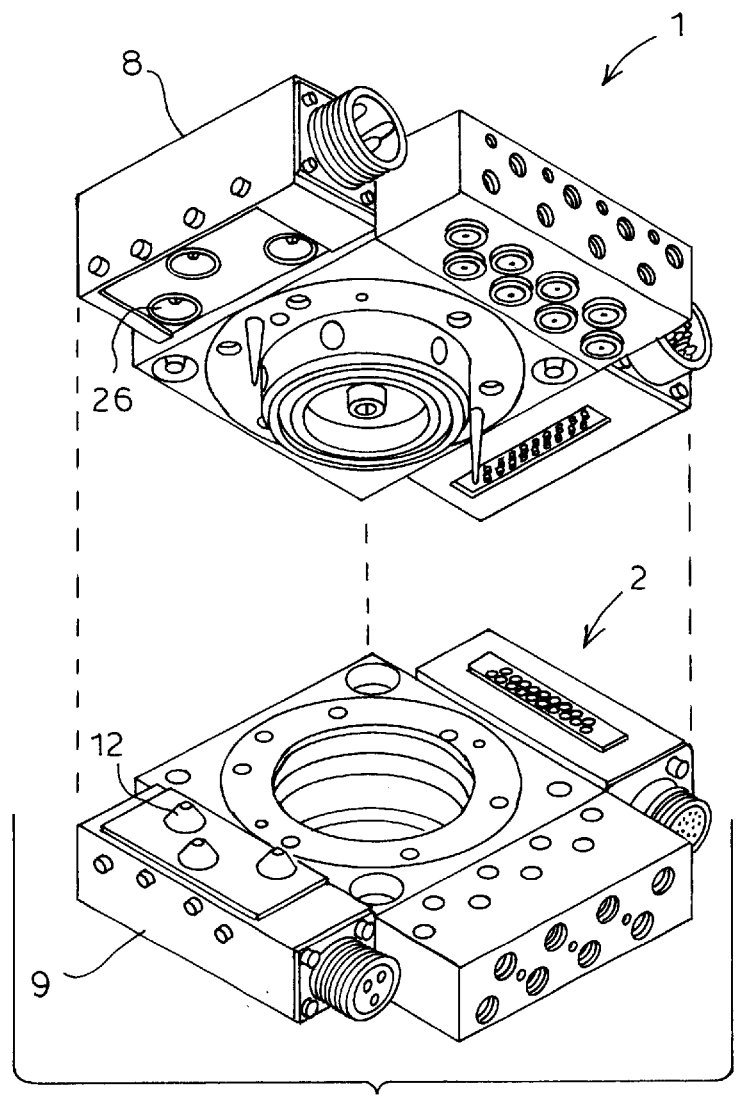
FIG. 3 is a perspective view of a robotic tool changer having the improved electrical contacts of the present invention.

FIG. 3 shows a robotic tool changer incorporating the improved electrical contacts 12 and 26 of the present invention. Again, the master assembly 1 and the tool assembly 2 include high power modules 8 and 9, respectively.

Figure 4:
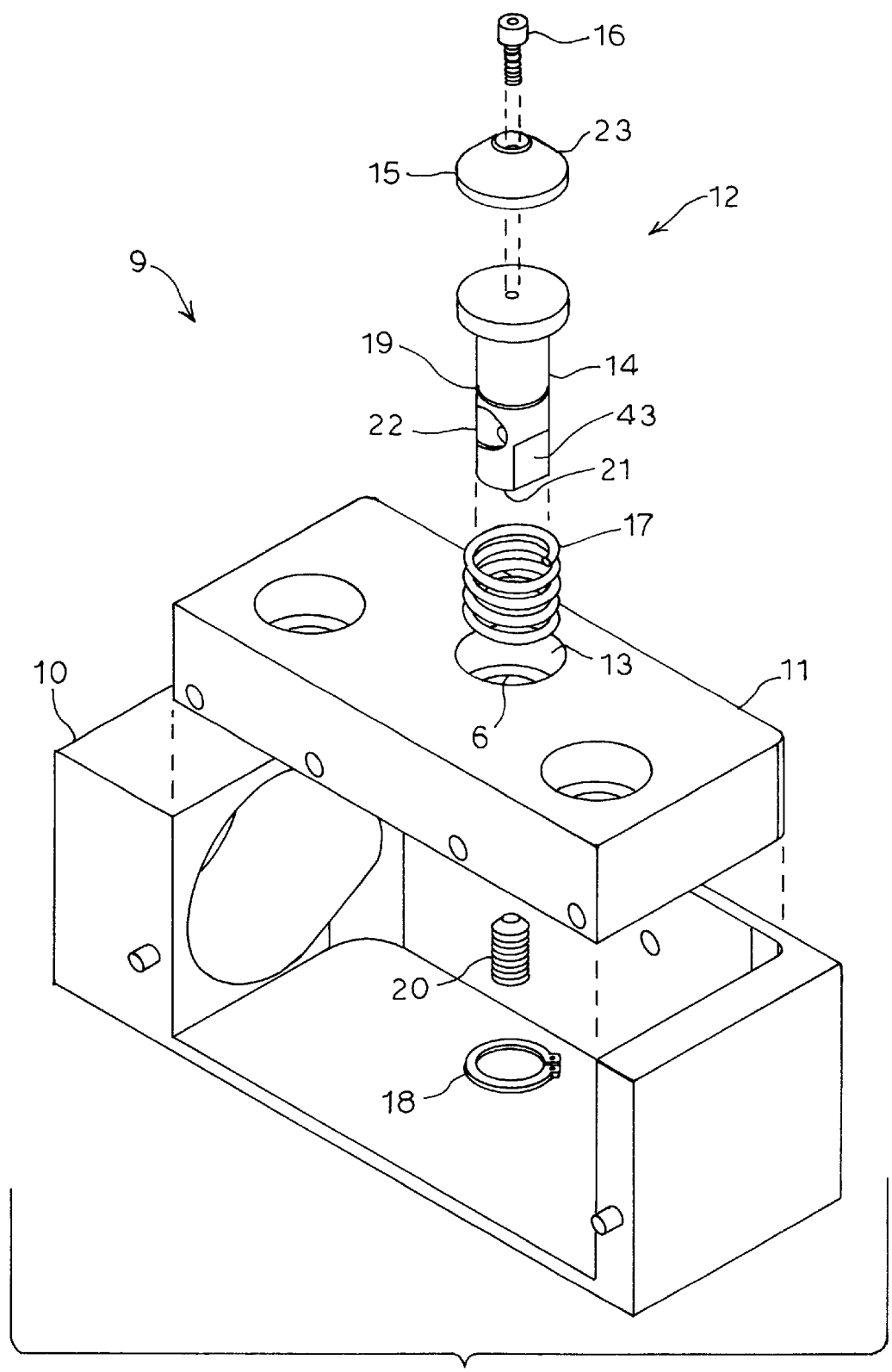
FIG. 4 is an exploded perspective view of a disassembled tool high power module showing a male electrical contact of the present invention.

FIG. 4 shows the tool high power module 9 in a disassembled state. The tool high power module 9 is preferably made up of an electrically insulating module housing 10, an electrical insulator block 11, and several electrical contacts 12 (only one being shown in FIG. 4). Alternatively, the module housing 10 and the insulator block 11 could be formed in one piece. A hole 13 is provided in the insulator block 11 for receiving each electrical contact 12.

The electrical contact 12 preferably comprises a contact base 14 (also shown in FIGS. 5 and 6) and a contact tip 15 (also shown in FIGS. 7 and 8). During assembly, an electrically-conductive graphite-based lubricant preferably is applied between the contact tip 15 and the contact base 14 to reduce friction and ensure good electrical contact between the two. A screw 16 secures the contact tip 15 to the contact base 14 as shown in FIG. 9. Optionally, a thread-locking compound, such as that sold under the trade name "Loctite," can be used to prevent the screw 16 from loosening during operation.

As an alternative to having separate pieces, the contact tip 15 and the contact base 14 could be formed together in one piece. However, for ease of replacement, it is preferable for the contact tip 15 and the contact base 14 to be separate pieces.

A compression spring 17 (FIG. 4) is inserted into the hole 13 below the lip of the contact base 14, with the other end of the spring 17 bearing against a lip 6 in the hole 13, thereby urging the contact 12 upwards. A retaining ring 18 seats within a groove 19 in the contact base 14 for retaining the contact 12 within the tool high power module 9 against the force of the spring 17. The spring 17 gives the contact 12 a limited amount of freedom of movement, sometimes referred to as "compliance", in the axial direction of the contact 12.

To enhance safety, the contact 12 which is designated to be the ground contact can be designed to project slightly more from the tool high power module 9 than the other contacts 12. This will ensure that the tool assembly 2 is properly grounded before the other contacts mate to complete the circuit.

A set screw 20 adapted to engage a threaded opening 21 (FIGS. 4 and 5) in the contact base 14 is provided for securing, within a through-hole 22 in the contact base 14, a cable carrying electrical current to the tool assembly 2. As shown in FIG. 6, the through-hole 22 preferably is not perfectly round, but instead has an oval or elliptical shape. This shape causes the electric cable to make better contact with the contact base 14 when fully tightened with the set screw 20. Wrench flats 43 are provided on the contact base 14 for securing the contact base 14 against rotation during installation.

As shown in FIG. 7, the contact tip 15 preferably has an outwardly-projecting conical or frusto-conical contact surface 23. This outwardly-projecting conical or frusto-conical contact surface 23 provides a large contact area, corrects misalignment between the master and tool high power modules 8 and 9, and, most importantly, tends to shed contamination from the surface of the contact 12. Due to the slope of the surface 23, any contaminants that may fall onto the contact tip 15 while the tool assembly 2 is exposed tend to slide or flow downward under the force of gravity until they fall or drip off of the contact tip 15 onto the insulator block 11. Because this conical or frusto-conical contact surface 23 is outwardly-projecting, this contact 12 will be referred to hereinafter as the male electrical contact 12. The contact with which it mates (discussed below) will be referred to as the female contact.

In order for the gravitational forces on the contaminant to be sufficient to overcome the friction and other attracting forces that would otherwise keep it from moving, the angle between the outwardly-projecting conical or frusto-conical contact surface 23 and a plane perpendicular to the axis of the male contact 12 is preferably at least about thirty degrees.

However, if the angle is too steep, the male contact 12 will be subjected to increased wear as it is coupled to and uncoupled from the corresponding female contact (discussed below). This increased wear, which results from the friction between the male and female contacts as they slide against each other, may substantially reduce the life of the contacts. Therefore, the angle between the outwardly-projecting conical or frusto-conical contact surface 23 of the male contact tip 15 and a plane perpendicular to the axis of the male contact 12 is preferably less than about sixty degrees.

Thus, the angle is preferably between about thirty degrees and about sixty degrees. Ideally, the angle is about forty-five degrees. The forty-five degree angle achieves the best balance between the positive effects of contamination prevention and the negative effects of increased sliding friction.

Figure 10:
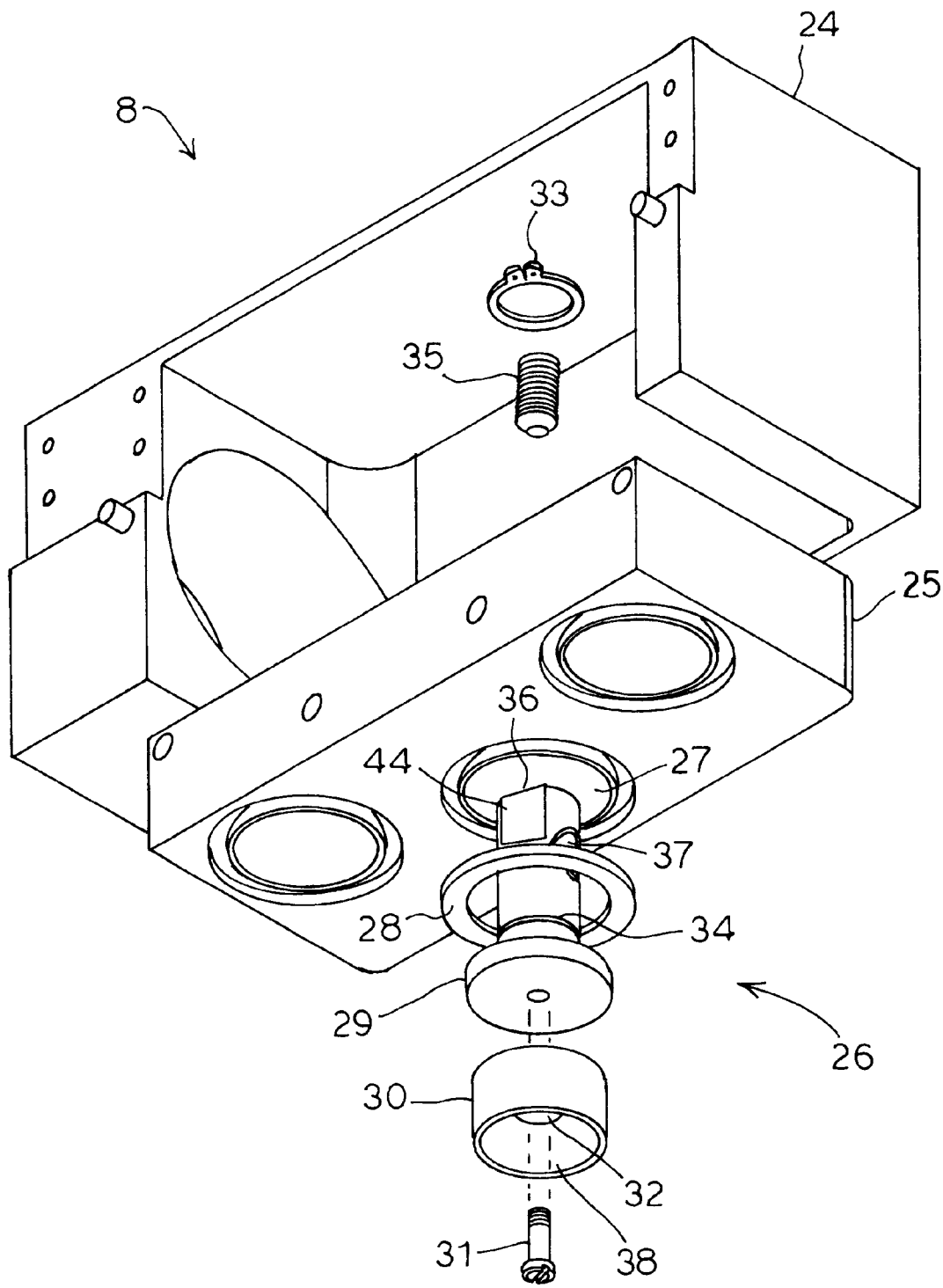
FIG. 10 is an exploded perspective view of a disassembled master high power module showing a female electrical contact of the present invention.

FIG. 10 shows the master high power module 8 in a disassembled state. The master high power module 8 is also preferably made up of a module housing 24, an insulator block 25, and several female electrical contacts 26 (only one being shown in FIG. 10). Alternatively, the module housing 24 and the insulator block 25 could be formed in one piece.

A hole 27 is provided in the insulator block 25 for receiving each female electrical contact 26. Each 27 hole is preferably provided with an o-ring or gasket 28 surrounding its opening to seal the contact 26 when the master and tool assemblies 1 and 2 are mated.

Figure 11:
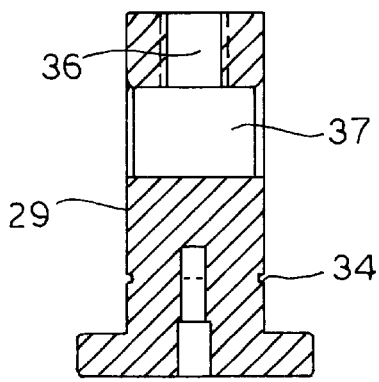
FIG. 11 is a cross-section of the female contact base.
Figure 14:
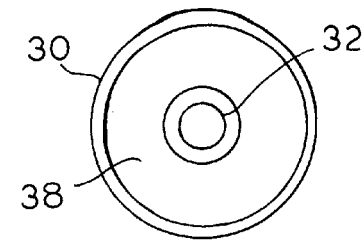
FIG. 14 is a top view of the female contact tip.
Figure 12:
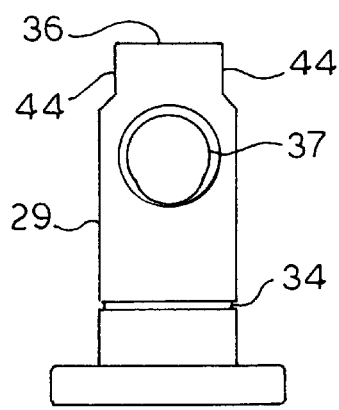
FIG. 12 is a side view of the female contact base.
Figure 13:
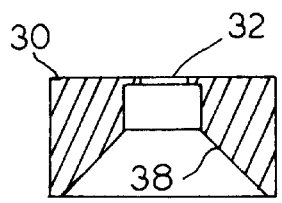
FIG. 13 is a cross-section of the female contact tip showing the conical contact surface.

The female electrical contact 26 preferably comprises a contact base 29 (also shown in FIGS. 11 and 12) and a female contact tip 30 (also shown in FIGS. 13 and 14). Again, the female contact tip 30 and the contact base 29 could be formed together in one piece. However, for ease of replacement, it is still preferable for the female contact tip 30 and the contact base 29 to be separate pieces.

Figure 15:
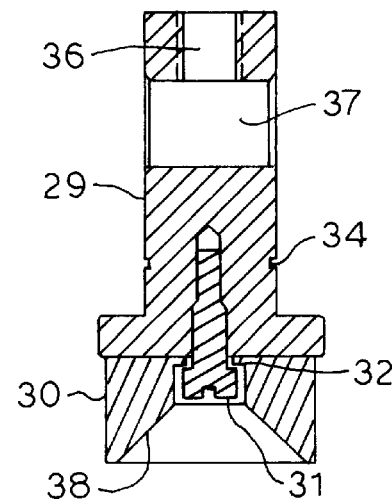
FIG. 15 is a cross-section of the female contact tip attached to the female contact base by a shoulder screw.

An electrically-conductive graphite-based lubricant again is preferably applied between the contact tip 30 and the contact base 29 during assembly to reduce friction and ensure a good electrical connection. A shoulder screw 31 is preferably used to secure the female contact tip 30 to the contact base 29, as shown in FIG. 15. Again, a thread-locking compound can be used to prevent the shoulder screw 31 from loosening during operation.

Preferably, the diameter of the hole 32 in the female contact tip 30 through which the shoulder screw 31 passes is slightly larger than the diameter of the shoulder on the shaft of the shoulder screw 31. Furthermore, it is also preferable for the head of the shoulder screw 31 not to press the female contact tip 30 tightly against the contact base 29 when the shoulder screw 31 is fully tightened. This gives the female contact tip 30 a limited amount of horizontal and rotational compliance so as to ensure proper mating with the male contact tip 15. Optionally, the male contact tip 15 could have horizontal and/or rotational compliance in this manner instead of or in addition to the female contact tip 30.

As with the male contact 12, a retaining ring 33 (FIG. 10) seats within a groove 34 in the contact base 29 for retaining the female contact 26 within the master high power module 8 against the force of gravity.

A set screw 35 adapted to engage a threaded opening 36 (FIGS. 11 and 15) in the contact base 29 is provided for securing within a through-hole 37 in the contact base 29 a cable carrying electrical current from the master assembly 1. As shown in FIG. 12, this through-hole 37, like the through-hole 22 in the male contact base 14, preferably is not perfectly round, but also has an oval or elliptical shape. Again, this shape causes the electric cable to make better contact with the contact base 29 when fully tightened with the set screw 35. Wrench flats 44 are once more provided on the contact base 29 for securing the contact base 29 against rotation during installation.

As shown in FIG. 13, the female contact tip 30 preferably has an inwardly-recessed conical or frusto-conical contact surface 38 adapted to mate with the outwardly-projecting conical or frusto-conical contact surface 23 of the male contact tip 15. The angle between the inwardly-recessed conical or frusto-conical contact surface 38 of the female contact tip 30 and a plane perpendicular to the axis of the female contact 26 should be approximately the same as the angle between the outwardly-projecting conical or frusto-conical contact surface 23 of the male contact tip 15 and a plane perpendicular to the axis of the male contact 12. As noted above, this angle is preferably between about thirty degrees and about sixty degrees, and ideally about forty-five degrees.

Figure 16:
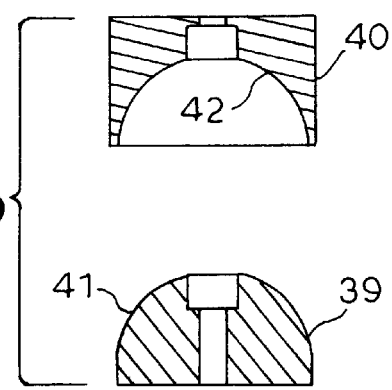
FIG. 16 is a cross-section of an alternate embodiment of the present invention in which the male and female contact tips have a spherical shape.

As shown in FIG. 16, the male and female contact tips 39 and 40 alternatively could have corresponding outwardly-projecting and inwardly-recessed contact surfaces 41 and 42 having spherical, frusto-spherical, ellipsoid, frusto-ellipsoid, ovoid, or frusto-ovoid shapes. Such shapes, although not as effective as the conical or frusto-conical shapes, would nonetheless tend to cause any contaminants to slide off of the contact tip. Like the conical or frusto-conical shapes, they would also provide a larger contact area than prior art contacts and would tend to correct any misalignment of the master and tool high power modules 8 and 9.

Figure 17:
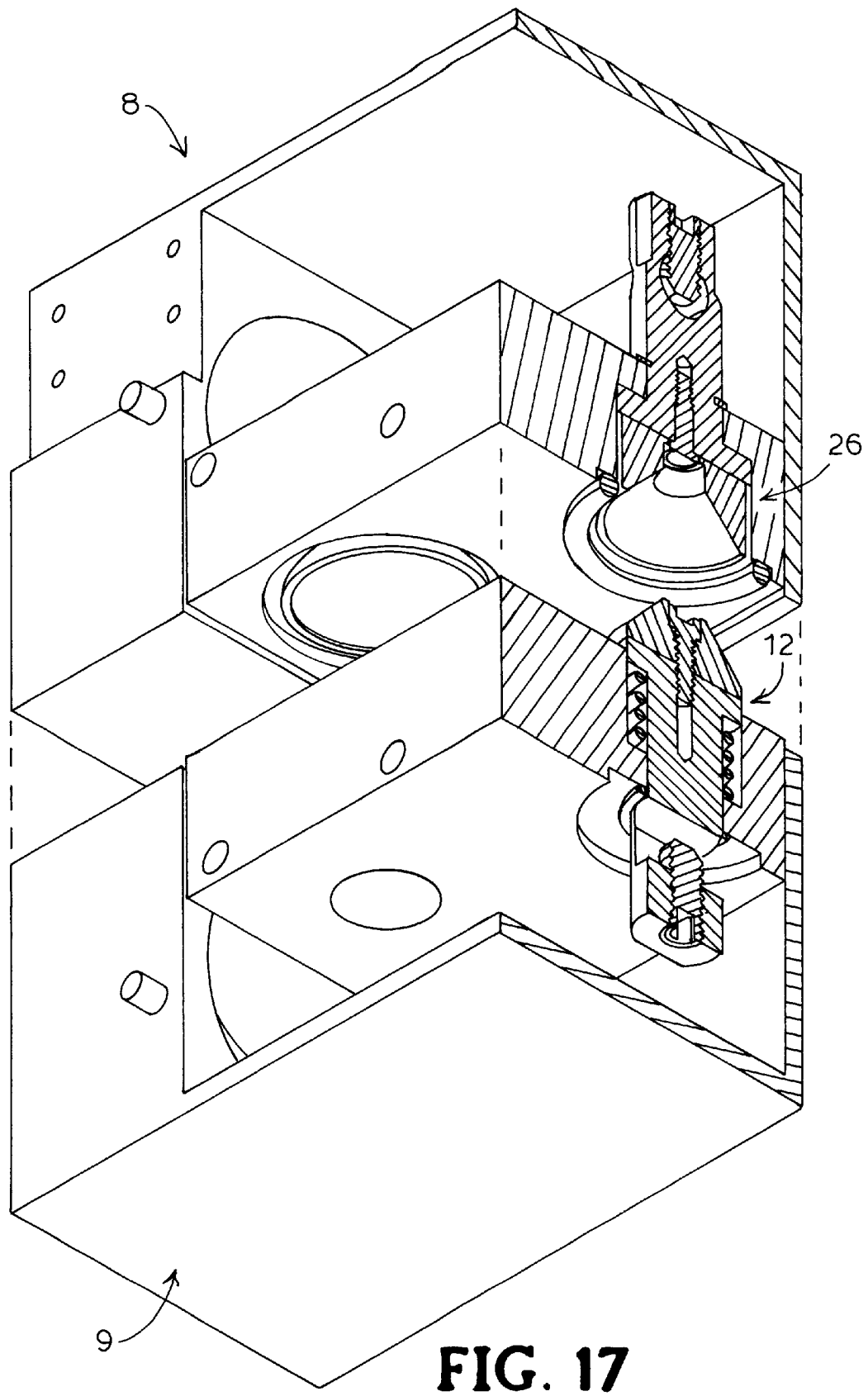
FIG. 17 is a perspective cross-section view of the master and tool high power modules mating with one another.

Regardless of the shape of the contacts, they should be adapted to mate with one another as shown in FIG. 17. As described above, it is preferable for the male contact 12 to be on the tool high power module 9 and for the female contact 26 to be on the master high power module 8. This is because the male contact 12 will tend to cause contaminants to slide off the contact, whereas the female contact 26 will tend to cause contaminants to collect at the center of the contact. Therefore, the male contact 12 will not become contaminated and damaged as easily as the female contact 26. Since the tool high power module 9 will be subjected to longer periods of exposure, and will be left upright during such periods, it is therefore desirable for the male contact 12 to be mounted on the tool high power module 9. However, the female contact 26 is still more resistant to contamination on the contact surface than prior art contacts. Therefore, it is within the contemplation of the present invention for the female contact 26 to be mounted on the tool high power module 9 and for the male contact 12 to be mounted on the master high power module 8.

The contacts 12 and 26 should be made of a highly conductive metal, such as copper or a copper alloy, in order to transfer the high power (10–500 Amps at 100–1000 Volts) effectively between the master and tool assemblies 1 and 2. In order to make the contacts more wear-resistant, they are preferably made out of a chromium copper alloy (welding copper) which is stronger than plain copper. Alternatively, the metal could be a beryllium copper or lead copper alloy. However, a chromium copper alloy achieves the best balance between strength and conductivity. The contacts 12 and 26 may be shaped by a machining process or by other metal shaping techniques well known in the art.

While the chromium copper alloy makes the contacts 12 and 26 more wear-resistant than plain copper, it is preferable to also give the contacts 12 and 26 or just the contact tips 15 and 30 a rhodium plating. The rhodium makes the contacts 12 and 26 or contact tips 15 and 30, as the case may be, much more durable, thereby significantly increasing the life of the contacts.

Rhodium also has a higher melting point than many other materials used to plate contacts, such as silver. In fact, the melting point of rhodium is near the melting point of steel, the main component of welding slag. Since any welding slag that lands on the surface of the contact 12 will have cooled somewhat since being melted, it is unlikely that the welding slag will still be hot enough to partially melt the localized area of the rhodium-plated contact 12 and become welded to it. Thus, the rhodium plating makes the contact 12 even less susceptible to contamination.

Although the chromium copper alloy and rhodium plating of the contacts 12 and 26, combined with their conical or frusto-conical shapes, make them very durable and contamination-resistant, they will nonetheless eventually become worn and need replacement. Therefore, ease of replacement remains an important issue. For that reason, the contact tips 15 and 30 of the present invention, which are the only portions of the contacts which might wear or become contaminated, can be easily replaced without the need to disassemble the high power modules or disconnect the cables connected to the contact bases. As is clear from FIG. 4, the male contact tip 15 can be replaced by simply unscrewing screw 16 while the contact base 14 remains secured to the tool high power module 9. Similarly, as shown in FIG. 10, the female contact tip 30 can be replaced by simply unscrewing the shoulder screw 31 while the contact base 29 remains secured to the master high power module 8. Thus, the entire replacement procedure can be performed in just a few minutes.

Therefore, the present invention provides improved high power electrical contacts for a robotic tool changer, which contacts are resistant to contamination and are easily replaceable.

While the improved high power electrical contacts described herein constitute the preferred embodiment of the present invention, it is to be understood that the invention is not limited to the precise form of apparatus disclosed and that changes may be made therein without departing from the scope of the invention which is defined by the following claims.

What is claimed is:

1. A high power electrical contact pair for carrying electrical current between two halves of a robotic tool changer, comprising:
    a. a male electrical contact mounted on one half of the robotic tool changer, said male electrical contact having an outwardly-projecting conical or frusto-conical contact surface, wherein the angle between the outwardly-projecting conical or frusto-conical contact surface and a plane perpendicular to the axis of the male electrical contact is between about 30° and about 60°; and
    b. a female electrical contact mounted on the other half of the robotic tool changer, said female electrical contact having an inwardly-recessed conical or frusto-conical contact surface, wherein the angle between the inwardly-recessed conical or frusto-conical contact surface and a plane perpendicular to the axis of the female electrical contact is approximately the same as the angle between the outwardly-projecting conical or frusto-conical contact surface of the male electrical contact and a plane perpendicular to the axis of the male electrical contact;

wherein when the two halves of the robotic tool changer are brought together, the outwardly-projecting conical or frusto-conical contact surface of the male electrical contact mates with the inwardly-recessed conical or frusto-conical contact surface of the female electrical contact, thereby allowing electrical current to flow between the male electrical contact and the female electrical contact.

2. A high power electrical contact pair as recited in claim 1, wherein the angle between the outwardly-projecting conical or frusto-conical contact surface of the male electrical contact and a plane perpendicular to the axis of the male electrical contact is about 45°.

3. A high power electrical contact pair as recited in claim 1, wherein:
    a. the robotic tool changer comprises a master assembly attached to a robot and a tool assembly attached to a tool to be used by the robot;
    b. the male electrical contact is mounted on the tool assembly; and
    c. the female electrical contact is mounted on the master assembly.

4. A high power electrical contact pair as recited in claim 1, wherein the outwardly-projecting conical or frusto-conical contact surface of the male electrical contact and the inwardly-recessed conical or frusto-conical contact surface of the female electrical contact are rhodium-plated.

5. A high power electrical contact pair as recited in claim 1, wherein:
    a. the male electrical contact comprises:
        i. a male contact tip having the outwardly-projecting conical or frusto-conical contact surface, and
        ii. a male contact base for attaching the male electrical contact to said half of the robotic tool changer;
    b. the male contact tip is removably attached to the male contact base, thereby allowing the male contact tip to be replaced without detaching the male contact base from said half of the robotic tool changer;
    c. the female electrical contact comprises:
        i. a female contact tip having the inwardly-recessed conical or frusto-conical contact surface, and
        ii. a female contact base for attaching the female electrical contact to said other half of the robotic tool changer; and
    d. the female contact tip is removably attached to the female contact base, thereby allowing the female contact tip to be replaced without detaching the female contact base from said other half of the robotic tool changer.

6. A high power electrical contact pair for carrying electrical current between two halves of a robotic tool changer, comprising:
    a. a male electrical contact made out of copper or a copper alloy, said male electrical contact being mounted on one half of the robotic tool changer and comprising:
        i. an outwardly-projecting conical or frusto-conical contact surface, and
        ii. a rhodium plating on the outwardly-projecting conical or frusto-conical contact surface; and
    b. a female electrical contact made out of copper or a copper alloy, said female electrical contact being mounted on the other half of the robotic tool changer and comprising:
        i. an inwardly-recessed conical or frusto-conical contact surface adapted to mate with the outwardly-projecting conical or frusto-conical contact surface of the male electrical contact, thereby allowing electrical current to flow between the male electrical contact and the female electrical contact, and
        ii. a rhodium plating on the inwardly-recessed conical or frusto-conical contact surface.

7. A high power electrical contact pair as recited in claim 6, wherein:
    a. the robotic tool changer comprises a master assembly attached to a robot and a tool assembly attached to a tool to be used by the robot;
    b. the male electrical contact is mounted on the tool assembly; and
    c. the female electrical contact is mounted on the master assembly.

8. A high power electrical contact pair as recited in claim 6, wherein:
    a. the male electrical contact further comprises:
        i. a male contact tip having the outwardly-projecting conical or frusto-conical contact surface, and
        ii. a male contact base for attaching the male electrical contact to said half of the robotic tool changer;
    b. the male contact tip is removably attached to the male contact base, thereby allowing the male contact tip to be replaced without detaching the male contact base from said half of the robotic tool changer;
    c. the female electrical contact further comprises:
        i. a female contact tip having the inwardly-recessed conical or frusto-conical contact surface, and
        ii. a female contact base for attaching the female electrical contact to said other half of the robotic tool changer; and
    d. the female contact tip is removably attached to the female contact base, thereby allowing the female contact tip to be replaced without detaching the female contact base from said other half of the robotic tool changer.

9. A high power electrical contact pair for carrying electrical current between two halves of a robotic tool changer, comprising:

a. a male electrical contact mounted on one half of the robotic tool changer, said male electrical contact comprising:
   i. a male contact base for attaching the male electrical contact to said half of the robotic tool changer, and
   ii. a male contact tip having an outwardly-projecting conical or frusto-conical contact surface, said male contact tip being removably attached to the male contact base, thereby allowing the male contact tip to be replaced without detaching the male contact base from said half of the robotic tool changer; and b. a female electrical contact mounted on the other half of the robotic tool changer, said female electrical contact comprising:
   i. a female contact base for attaching the female electrical contact to said other half of the robotic tool changer, and
   ii. a female contact tip having an inwardly-recessed conical or frusto-conical contact surface adapted to mate with the outwardly-projecting conical or frusto-conical contact surface of the male contact tip to thereby allow electrical current to flow between the male electrical contact and the female electrical contact, said female contact tip being removably attached to the female contact base, thereby allowing the female contact tip to be replaced without detaching the female contact base from said other half of the robotic tool changer.

10. A high power electrical contact pair as recited in claim 9, wherein the female contact tip is removably attached to the female contact base in such way as to have compliance in at least one direction.

11. A high power electrical contact pair as recited in claim 10, wherein:

a. the female electrical contact further comprises a screw removably attaching the female contact tip to the female contact base, said screw having a shaft;
a. the female contact tip has a hole through which the screw passes, said hole having a diameter larger than the diameter of the shaft of the screw, thereby giving the female contact tip compliance in a direction perpendicular to the axis of the screw.

12. A high power electrical contact pair as recited in claim 11, wherein the screw, when fully tightened, does not press the female contact tip firmly against the female contact base, thereby giving the female contact tip rotational compliance.

13. A high power electrical contact pair as recited in claim 9, wherein the male contact tip is removably attached to the male contact base in such way as to have compliance in at least one direction.

14. A high power electrical contact pair as recited in claim 13, wherein:

a. the male electrical contact further comprises a screw removably attaching the male contact tip to the male contact base, said screw having a shaft; and
a. the male contact tip has a hole through which the screw passes, said hole having a diameter larger than the diameter of the shaft of the screw, thereby giving the male contact tip compliance in a direction perpendicular to the axis of the screw.

15. A high power electrical contact pair as recited in claim 14, wherein the screw, when fully tightened, does not press the male contact tip firmly against the male contact base, thereby giving the male contact tip rotational compliance.

16. A high power electrical contact pair as recited in claim 9, further comprising an electrically-conducting lubricant applied between the male contact tip and the male contact base.

17. A high power electrical contact pair as recited in claim 9, further comprising an electrically-conducting lubricant applied between the female contact tip and the female contact base.

18. A high power electrical contact pair as recited in claim 9, wherein:

a. the robotic tool changer includes at least one high power cable;
b. the male contact base has a threaded opening and an oval-shaped or elliptical-shaped through-hole intersecting the threaded opening; and
c. the male electrical contact further comprises a set screw adapted to screw into the threaded opening to secure the high power cable within the through-hole.

19. A high power electrical contact pair as recited in claim 9, wherein:

a. the robotic tool changer includes at least one high power cable;
b. the female contact base has a threaded opening and an oval-shaped or elliptical-shaped through-hole intersecting the threaded opening; and
c. the female electrical contact further comprises a set screw adapted to screw into the threaded opening to secure the high power cable within the through-hole.

20. A high power electrical contact pair for carrying electrical current between two halves of a robotic tool changer, comprising:

a. a male electrical contact mounted on one half of the robotic tool changer, said male electrical contact comprising an outwardly-projecting contact surface having a shape selected from the group consisting of spherical, frusto-spherical, ellipsoid, frusto-ellipsoid, ovoid, and frusto-ovoid shapes; and b. a female electrical contact mounted on the other half of the robotic tool changer, said female electrical contact comprising an inwardly-recessed contact surface adapted to mate with the outwardly-projecting contact surface of the male electrical contact, thereby allowing electrical current to flow between the male electrical contact and the female electrical contact.

* * * * *

UNITED STATES PATENT AND TRADEMARK OFFICE
CERTIFICATE OF CORRECTION

PATENT NO : 6,116,966
DATED : September 12, 2000
INVENTOR(S): Robert D. Little and Prasad Balakrishnan It is certified that error appears in the above-identified patent and that said Letters Patent are hereby corrected as shown below:

In the abstract, after "elliptical shaped", delete "though-holes" and insert therefor --through-holes--.

At column 11, line 42, delete "a." and insert therefor --b.--.

At column 12, line 1, delete "a." and insert therefor --b.--.

Signed and Sealed this

Twenty-fourth Day of April, 2001

Attest:

NICHOLAS P. GODICI

Attesting Officer

Acting Director of the United States Patent and Trademark Office